United States Patent [19]
McGuire

[11] 3,799,580
[45] Mar. 26, 1974

[54] GRAVEL GUARD FOR VEHICLES

[76] Inventor: Pendleton R. McGuire, Wylliesburg, Va. 23976

[22] Filed: Oct. 12, 1971

[21] Appl. No.: 188,039

[52] U.S. Cl. .......................................... 280/154.5 R
[51] Int. Cl. .......................................... B62d 25/16
[58] Field of Search ............... 280/154.5 R; 29/453; 287/20.92 T, 64

[56] References Cited
UNITED STATES PATENTS

| | | | |
|---|---|---|---|
| 3,726,544 | 4/1973 | Miller | 280/154.5 R |
| 3,051,508 | 8/1962 | Federspiel | 280/154.5 R |
| 3,158,386 | 11/1964 | Tillinghast | 280/154.5 R |
| 3,338,284 | 8/1967 | Ausnit | 287/20.92 T |

Primary Examiner—Robert R. Song

[57] ABSTRACT

A truck gravel guard for attachment to a vehicle such as a truck-trailer or the like behind the rear wheels thereof to stop mud or gravel thrown rearwardly by said wheels from splashing upwardly onto following vehicles and which guard has two detachable sections with one section attachable to the truck and the second section to normally hang below said first section, but can be detached therefrom and replaced.

1 Claim, 5 Drawing Figures

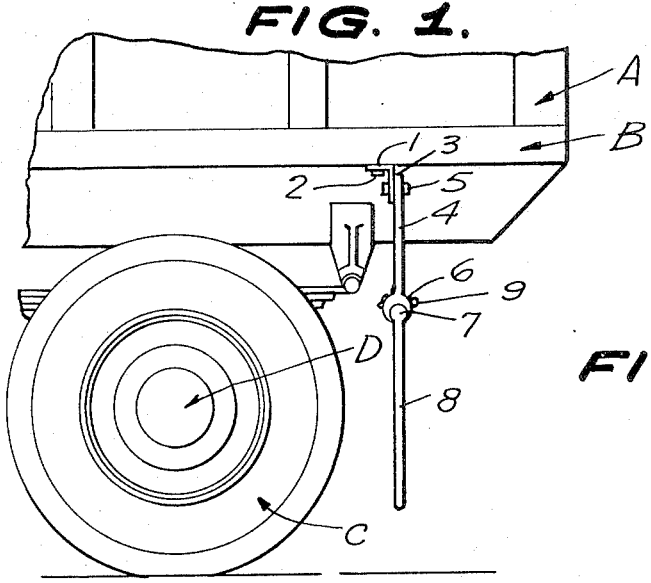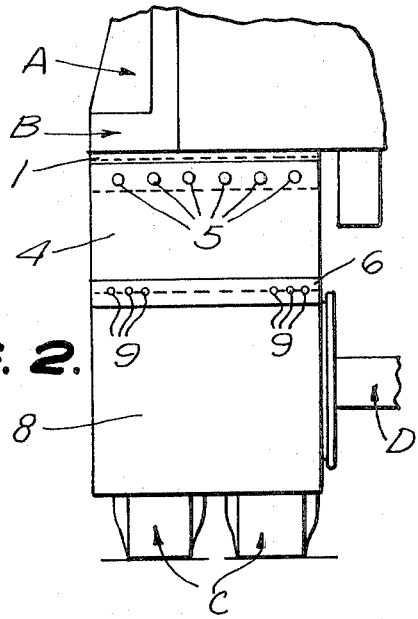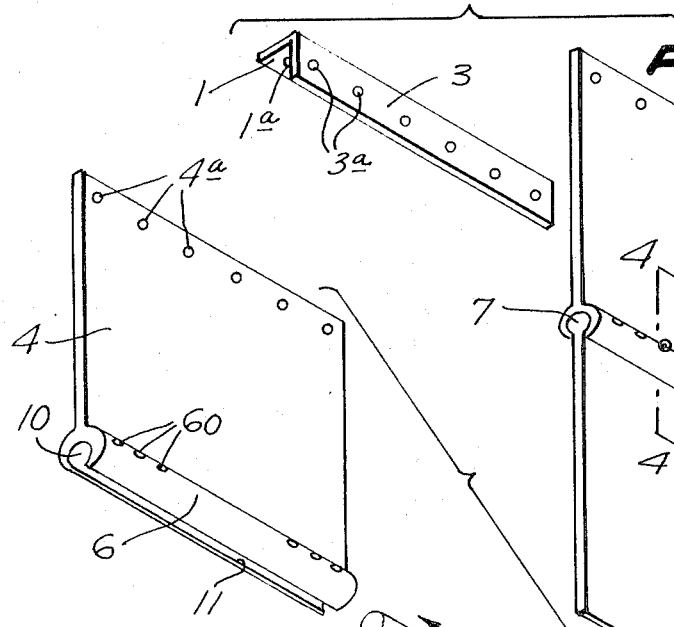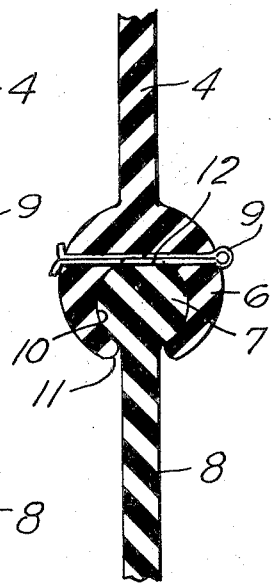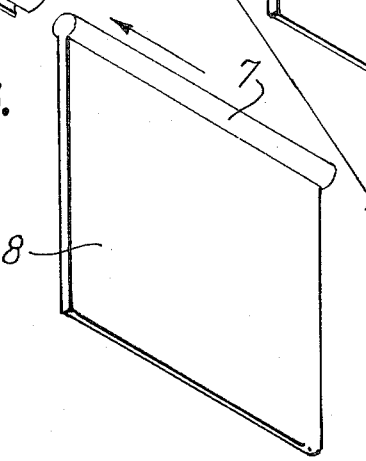
INVENTOR.
PENDLETON R. McGUIRE,
BY
Linton and Linton
ATTORNEYS.

GRAVEL GUARD FOR VEHICLES

The present invention is concerned with an improvement in vehicle gravel guards.

The principal object of the present invention is to provide a guard or flap readily attachable to a vehicle behind the rear wheels thereof so as to hang downwardly for stopping debris thrown by said wheels against said guard preventing said debris from striking following vehicles and which guard is in two sections, an upper section attached to the vehicle and a lower section detachably connected to said upper section, whereby the lower section can be quickly and readily detached intentionally or by said lower section being caught between said wheels and a curb or the like.

A further important object of the invention is to provide a vehicle gravel guard in two sections with one section having an elongated resilient socket in one edge and the other section having an elongated enlarged edge normally mating with said socket, but capable of being withdrawn therefrom and means for preventing lateral movement between said socket and said section enlarged edge whereby said sections can be separated and reunited or have a similar new section replace one of said original sections.

Still further objects of the invention will be in part obvious and in part pointed out in the following detailed description of the accompanying drawing, in which, FIG. 1 is a side view of the rear end of a portion of a truck with the present gravel guard attached thereto.

FIG. 2 is a rear view of the truck rear portion and gravel guard of FIG. 1.

FIG. 3 is an enlarged exploded perspective view of the gravel guard and attaching angle iron, FIG. 4 is a further enlarged cross-sectional view taken on line 4—4 of FIG. 3, and FIG. 5 is an enlarged exploded perspective view of the two sections of the gravel guard in their detached positions.

Referring now more particularly to the accompanying drawing, wherein like and corresponding parts are indicated by the same reference characters, A generally designates the rear portion of a truck having body frame B and wheels C rotatably mounted on axle D supported beneath said body frame. This indicates a conventional truck which is shown only as an example as other types of trucks, tractors or trailers can equally as well use the present gravel guard.

An angle iron has a side 1 with openings 1a through which bolts 2 extend into body frame 1 for attachment thereto. A second side 3 of said angle iron has openings 3a.

The upper section 4 of the gravel guard has openings 4a which match openings 3a and bolts 5 extend through openings 3a and 4a attaching section 4 to side 3 of the angle iron.

Section 4 has a socket 6 provided along its bottom edge.

The lower section 8 of the gravel guard has an enlarged upper edge 7 which in the drawing is shown as having an annular cross-section of a size for slideable insertion into and mating with slot 10, also of an annular cross-section, but having a greater diameter than the width of mouth 11 of said slot. The configuration of slot 10 and edge 7 can be varied from that shown as long as the two mate with one another.

Said socket 6 also has openings 6a therethrough for the passage of colter pins 9. The top of edge 7 has a series of recesses 12 therein each positioned in line with one of said openings 6a so that each colter pin 9 extends through one of said recesses 12 preventing the lateral movement of section 8 relative to section 4, but allowing the withdrawal of edge 7 through mouth 11. When a section 8 is so detached from section 4, the same or a similar section 8 can be reattached to the section 4 by removing the colter pins 9 from openings 6a, sliding the edge 7 of section 8 into slot 10 until the recesses 12 align with the openings 6a and then reinserting the colter pins 9.

Sections 4 and 8 of the gravel guard can be made of rubber, plastic, or other non-moisture absorbent and resilient material. Socket 6 is shown integral with section 4, but may be a separate element of the same or different material from the rest of section 4. For example, socket 6 could be of a resilient metal, plastic or rubber bonded or riveted to section 4 which may be of rubber, plastic or resilient sheet metal.

As example of one form of the present gravel guard, section 4 may be 24 inches wide and 20 inches long including socket 6, while section 8 may be 24 inches wide and 16 inches long. The thickness of said sections will depend on the material used and should be thick enough to withstand repeated hits by gravel and yet have a long life.

Section 8 can be detached from section 4 by removing colter pins 9 and laterally sliding edge 7 from slot 10. Thus when section 8 becomes worn or torn it can be quickly and easily detached and replaced by a new section 8. Also it sometimes occurs that a truck will back up to a curb or the like causing the gravel guard section 8 to be caught between the rear wheel C an the curb pulling on said section tending to tear the entire gravel guard from the truck. In the present gravel guard it would require about 150 lbs pull to tear section 4 from angle iron side 3, but only 75 lbs pull to detach section 8 from section 4. Therefore the section 8 would be detached with minimum injury thereto and could be readily reattached to the section 4 without requiring special skill or tools.

Reference herein to bolts 2 and 5 is meant to include bolts with nuts thereon, rivets, screws or other types of conventional fasteners.

I claim:

1. A gravel guard for vehicles consisting of a pair of resilient guard sections, one of said guard sections having an end portion capable of attachment to a vehicle and an opposite end portion with an enlarged edge portion having a socket therein of an annular cross-section and extending laterally of said guard edge portion, said socket having a restricted mouth opening in said guard edge portion, the other of said guard sections having an enlarged edge portion of an annular cross-section detachably mating with said first guard section socket, said other guard section edge portion having a greater diameter than the width of said first guard section socket mouth whereby said other guard section can be detachably retained in said socket until forcibly pulled therefrom through said socket mouth due to the resiliency of said guard sections, said socket having at least one lateral opening, said other guard section enlarged edge portion having at least one recess aligned with said socket opening, and a pin like member detachably extending through said socket opening and said recess for preventing relative lateral movement between said guard sections.

* * * * *